United States Patent [19]
Dreyfuss

[11] 3,957,956
[45] May 18, 1976

[54] CLOSED CYCLE ION EXCHANGE METHOD FOR REGENERATING ACIDS, BASES AND SALTS

[75] Inventor: Robert M. Dreyfuss, Livermore, Calif.

[73] Assignee: The United States of America as represented by the United States Energy Research and Development Administration, Washington, D.C.

[22] Filed: June 20, 1974

[21] Appl. No.: 481,300

[52] U.S. Cl. ............................... 423/394; 423/509
[51] Int. Cl.² .................................... C01B 21/40
[58] Field of Search ............ 423/394, 509, 181, 182, 423/648, 652, 657; 23/312 AH, 312 W

[56] References Cited
UNITED STATES PATENTS

| | | | |
|---|---|---|---|
| 2,430,255 | 11/1947 | Stewart | 423/509 |
| 2,778,714 | 1/1957 | Kasper et al. | 423/657 |
| 3,197,359 | 7/1965 | Logan | 423/181 |
| 3,839,550 | 10/1974 | Wentorf | 423/657 |

*Primary Examiner*—Walter R. Satterfield
*Attorney, Agent, or Firm*—Dean E. Carlson; F. A. Robertson; Irene S. Croft

[57] ABSTRACT

A method for conducting a chemical reaction in acidic, basic, or neutral solution as required and then regenerating the acid, base, or salt by means of ion exchange in a closed cycle reaction sequence which comprises contacting the spent acid, base, or salt with an ion exchanger, preferably a synthetic organic ion-exchange resin, so selected that the counter ions thereof are ions also produced as a by-product in the closed reaction cycle, and then regenerating the spent ion exchanger by contact with the by-product counter ions. The method is particularly applicable to closed cycle processes for the thermochemical production of hydrogen.

10 Claims, No Drawings

… …

CLOSED CYCLE ION EXCHANGE METHOD FOR REGENERATING ACIDS, BASES AND SALTS

BACKGROUND OF THE INVENTION

The invention described herein was made in the course of, or under, Contract W-7405-ENG-48 with the U.S. Atomic Energy Commission.

This invention relates to a method for conducting reactions in acidic, basic, or neutral solutions, as required, and then regenerating the acid, base, or salt into a closed reaction cycle.

From an economic and environmental standpoint, it is desirable to utilize the by-products of a chemical process to regenerate starting materials, thereby avoiding both waste of new materials and pollution of the environment. In a closed process cycle, all catalytic materials or intermediate compounds must be regenerated by conversion of by-products formed in the process. Many chemical reactions involving aqueous solutions require careful control of pH for optimum results. Ordinarily, this would present no difficulty; one simply adds sufficient acid, base, or salt to establish the required pH. However, in a closed reaction cycle it is necessary to regenerate the acid, base, or salt for reuse in the reaction sequence.

The use of ion-exchange resins for the reversible interchange of ions with an aqueous solution is well known in the art. Thus, it would be possible to regenerate an acid, base, or salt by employing a suitable ion-exchange resin. In fact, such resins have been used to regenerate spent acid liquors, e.g., spent phosphoric, acetic, and oxalic acid liquors. Since the interchange of ions is reversible, the ion-exchange resins are themselves regenerated by external treatment with a suitable reagent. In a closed process cycle, however, it is necessary to provide for the regeneration of the ion-exchange resin by means of reagents which are produced in the process cycle itself.

It is, therefore, among the objects of the present invention to provide a method for conducting reactions in acidic, basic, or neutral solution, as required, and then regenerating the acid, base, or salt by means of an ion exchanger in a closed reaction cycle.

SUMMARY OF THE INVENTION

In accordance with the present invention, there is provided a method for regenerating a pH-controlling compound of the class consisting of ionizable acids, bases, and salts by means of ion exchange in a closed cycle, thereby making it possible to conduct a chemical reaction of a closed cycle reaction sequence in acidic, basic, or neutral solution as required.

The method of the present invention comprises contacting the spent pH-controlling compound with an ion exchanger, preferably a synthetic organic ion-exchange resin so selected that the counter ions thereof are ions which are also produced as a by-product in the closed reaction cycle, and then contacting the spent ion exchanger with the by-product counter ions under conditions which will promote regeneration of the ion exchanger.

Ion exchangers are solid materials consisting of a framework which is held together by chemical bonds or lattice energy. This framework carries a positive or negative electric surplus charge which is compensated by ions of opposite sign which are called counter ions. In a cation exchanger, the counter ions are positively charged; in an anion exchanger, the counter ions are negatively charged. The framework of a cation exchanger may be regarded as a macromolecular or crystalline polyanion, that of an anion exchanger as a polycation. The ion exchanger used in the present invention can be either natural or synthetic, the synthetic organic ion-exchange resins being preferred. Suitable ion exchangers are fully described in F. G. Helfferich, *Ion Exchange*, McGraw-Hill Book Co., N.Y., 1962. Of the cation exchange resins described therein, the most suitable are addition copolymers prepared from vinyl monomers. The most important resins of this type are crosslinked polystyrenes with sulfonic acid groups which have been introduced after polymerization by treatment with concentrated sulfuric acid or chlorosulfonic acid. The most suitable anion exchangers are made from crosslinked styrene pearl polymers. Ion-exchange resins of the foregoing classes are well known in the art and are readily available.

In one particular embodiment of the invention wherein it is required to conduct a chemical reaction in an acidic solution and an acid is added to control pH, the spent acid is regenerated by contact with a cation exchange resin so selected that the compound formed from the cation thereof and the anion of the added acid is thermally decomposable to yield regenerated acid and a compound capable of providing the cation necessry for regeneration of spent cation exchanger. Specifically, acetic acid is added to the solution to control the pH thereof whereby an acetate salt is produced, and the acetate salt is contacted with an $NH_4^+$ (resin) thereby forming ammonium acetate. The ammonium acetate is then thermally decomposed to regenerate acetic acid and to produce ammonia which, when dissolved in water, provides the ammonium ion necessary for regeneration of the spent cation exchanger. Other acids, such as formic acid, substituted acetic acids, and the like, can also be used.

In another embodiment of the invention wherein it is required to conduct a chemical reaction in a basic solution and a basic acting salt, i.e., a salt of a strong base and a weak acid, for example, an alkali metal acetate, is added to control pH whereby the weak acid is produced as a by-product, the spent salt, that is, the by-product compound containing the cation of the added salt, is contacted with a cation exchange resin having hydrogen ion as the cation thereon whereby hydrogen ion is exchanged with the cation of the salt, and the spent cation exchange resin is then contacted with the weak acid produced as a by-product of the reaction to regenerate the cation exchange resin and the basic acting salt. In aqueous solution, the weak acid dissociates to provide the hydrogen ions necessray for regeneration of spent cation exchange resin and the anions necessary for regeneration of the basic acting salt. The basic acting salt is reformed from the cations released from the resin during the regeneration thereof and the anions provided by dissociation of the weak acid.

DETAILED DESCRIPTION OF THE INVENTION

The invention will be described in detail with reference to closed cycle processes for the thermochemical production of hydrogen.

One closed process cycle for the thermochemical production of hydrogen, disclosed an claimed in copending application Ser. No. 481,263, of Oscar H.

Krikorian, filed concurrently herewith, now U.S. Pat. No. 3,928,549 issued Dec. 23, 1975, comprises hydrolyzing an intermetallic compound of a metal and a metalloidal element from one of groups V and VI of the periodic system, specifically, from the arsenic-antimony-bismuth subgroup or the selenium-tellurium subgroup, to produce an oxide or hydroxide of the metal, hydrogen, and the metalloidal element, or a compound which readily yields hydrogen and the metalloidal element; reacting the metalloidal element with the metal oxide or hydroxide, thereby regenerating the intermetallic compound and producing a marginally stable oxide of the metalloidal element; reducing the oxide of the metalloidal element with a reducing agent which can be regenerated by thermal decomposition, thereby regenerating the metalloidal element and oxidizing the reducing agent; and decomposing the oxidized reducing agent, thereby regenerating the reducing agent and producing oxygen. The net reaction of the foregoing sequence is the decomposition of water into hydrogen and oxygen.

Specifically, the above-described process involves the hydrolysis of an intermetallic compound of an alkali or alkaline earth metal and selenium or tellurium. It was found that this hydrolysis reaction, particularly in the case of the hydrolysis of an alkali metal selenide, required a pH of less than or equal to substantially 5 for optimum results. The pH of the solution in which the hydrolysis reaction is conducted can be controlled by the addition of an acid, for example, acetic acid. The following example illustrates a method for conducting the aforementioned hydrolysis reaction in an acidic medium and then regenerating spent acid by means of ion exchange in a closed cycle reaction sequence.

EXAMPLE 1

Potassium selenide was hydrolyzed in the presence of acetic acid and the spent acetic acid was regenerated by ion exchange with a cation exchange resin in a closed cycle reaction sequence in accordance with the present invention. The cation exchange resin used was a crosslinked polystyrene having sulfonic acid groups as described in F. G. Helfferich, *Ion Exchange*, op. cit., page 35. The process is represented by the following sequence of reactions wherein the symbol Ac represents the acetate radical.

1. $K_2Se + 2HAc \rightarrow 2KAc + H_2Se \sim 25°C$

2. $2KAc + 2NH_4^+ (resin) \rightarrow 2NH_4Ac + 2K^+(resin)$ ~25°C

3. $2NH_4Ac \rightarrow 2NH_3 + 2HAc \sim 165°C$

4. $2H_2O + 2NH_3 \rightleftarrows 2NH_4^+ + 2OH^- \sim 25°C$

5. $2NH_4^+ + 2K^+ (resin) \rightleftarrows 2NH_4^+ (resin) + 2K^+ \sim 25°C$

Net Reaction: $K_2Se + 2H_2O \rightarrow 2KOH + H_2Se$

In reaction (4), pressurizing the ammonia will shift equilibrium to the right thereby increasing the number of ammonium ions produced.

In Example 1 above, the cation exchange resin was selected to provide a cation which can combine with the anion of the acid to form a compound which can be thermally decomposed to regenerate the acid and to produce a compound capable of providing the cation necessary for regeneration of the cation exchanger.

Another closed cycle process for the thermochemical production of hydrogen, described in "A Low-Temperature Thermal Process for the Decomposition of Water", *Science*, 180, 959 (1973), comprises the steps of reacting an alkali metal nitrite, for example, lithium nitrite, with iodine and water to produce alkali metal nitrate and hydrogen iodide, decomposing the hydrogen iodide to produce hydrogen and regenerate iodine; and decomposing the alkali metal nitrate to produce oxygen and regenerate alkali metal nitrite. The reaction sequence, the net result of which is the decomposition of water into hydrogen and oxygen, is illustrated by the following set of reactions using lithium nitrite.

1. $LiNO_2 + I_2 + H_2O \rightarrow LiNO_3 + 2HI$  300°K

2. $2HI \rightarrow I_2 + H_2$  700°K

3. $LiNO_3 \rightarrow LiNO_2 + ½ O_2$  750°K

Reaction 1 is unfavorable in the acid solution resulting from the formation of alkali metal nitrate; however, the reaction will proceed in a basic solution. A basic solution can readily be provided by the addition of a basic-acting salt, the dissociation of which provides sufficient hydroxide ions to maintain the pH of the solution at the required level. The following example illustrates the use of such a salt to provide the required basic solution and the regeneration of the salt by means of a cation ion exchange resin in accordance with the process of the present invention.

EXAMPLE 2

The following sequence of reactions illustrates the reaction of lithium nitrite with iodine and water in a basic solution and the subsequent regeneration of the pH-controlling compound in a closed cycle. The symbol Ac represents the acetate radical.

1. $LiNO_2 + I_2 + 2KAc + H_2O \rightarrow LiNO_3 + 2HAc + 2KI$

2. $2KI + 2H^+ (resin) \rightarrow 2HI + 2K^+ (resin)$

3. $2HAc \rightleftarrows 2H^+ + 2Ac^-$

4. $2K^+ (resin) + 2H^+ \rightarrow 2K^+ + 2H^+(resin)$

Net reaction: $LiNO_2 + I_2 + H_2O \rightarrow LiNO_3 + 2HI$

In the above reaction sequence, the salt KAc reacts with water to form a dilute solution of undissociated HAc and free hydroxide ions. The free hydroxide ions maintain the pH at the required level for reaction. The HAc formed must be removed continuously; this can be accomplished by distillation. Thus, reaction 1 above can be regarded as two separate simultaneous reactions as follows:

1a. $KAc + H_2O \rightarrow K^+ + OH^- + HAc$

1b. $I_2 + K^+ + Ac^- + NO_2^- + OH^- \rightarrow NO_3^- + HAc + 2I^- + K^+$

In Example 2 above, acetic acid is formed as a by-product of the process, and the dissociation of the by-product acetic acid provides a source of hydrogen ions which can be utilized for cation exchange resin regeneration. Thus, an $H^+$-containing cation exchange resin is selected for regeneration of the potassium acetate.

Other basic acting salts which can be used in the sequence of Example 2 will be obvious to those skilled in the art. It is well known that the hydrolysis of a salt of a strong base and a weak acid forms the undissociated acid and hydroxide ions so that a solution of such a salt exhibits the characteristics of a base. (See L. Pauling, *General Chemistry*, W. H. Freeman & Co., S. F., 1956, Chapter 21, page 435.)

Although the present invention has been described with reference to specific examples, it will be appreciated that various changes and modifications can be made without departing from the true spirit and scope of the invention. Thus, it is not intended to limit the invention except by the terms of the following claims.

What I claim is:

1. In a closed cycle method for hydrolyzing an intermetallic compound of a metal and a metalloid selected from the group consisting of arsenic, antimony, bismuth, selenium, and tellurium, the steps comprising:
   a. adding sufficient acid to the hydrolysis reaction mixture to maintain the pH thereof at a level effective for hydrolysis, the acid thereby becoming spent as a consequence of the formation of the corresponding salt of the metal and the acid, said acid being characterized by an anion capable of forming with the cation of a cation exchange resin in a subsequent cation exchange step a compound thermally decomposable into the acid and a substance capable of providing the cation of the cation exchange resin;
   b. contacting the spent acid with the cation exchange resin, thereby forming said thermally decomposable compound and the cation exchange resin thereby becoming spent;
   c. thermally decomposing said thermally decomposable compound into the acid and the substance capable of providing the cation of the cation exchange resin; and
   d. contacting the spent cation exchange resin from step b with the cations provided by the thermal decomposition step, thereby regenerating the cation exchange resin.

2. The method according to claim 1 wherein the acid is acetic acid, the cation exchange resin is an organic cation exchange resin having the ammonium ion as the cation thereon, and the thermally decomposable compound is ammonium acetate.

3. The method according to claim 1 wherein the intermetallic compound is a compound of an alkali or alkaline earth metal and selenium and sufficient acid is added to the hydrolysis reaction mixture to maintain the pH thereof at less than or equal to substantially 5.

4. The method according to claim 3 wherein the acid is acetic acid, the cation exchange resin is an organic cation exchange resin having the ammonium ion as the cation thereon, and the thermally decomposable compound is ammonium acetate.

5. The method according to claim 4 wherein the intermetallic compound is an alkali metal selenide.

6. The method according to claim 5 wherein the alkali metal selenide is potassium selenide.

7. In the closed cycle method for the thermochemical production of hydrogen wherein an intermetallic compound of an alkali or alkaline earth metal and a metalloidal element selected from selenium and tellurium is hydrolyzed to produce an oxide or hydroxide of the metal, hydrogen, and the metalloidal element; the metalloidal element is reacted with the metal oxide or hydroxide to regenerate the intermetallic compound and produce an oxide of the metalloidal element; the oxide of the metalloidal element is reduced with a reducing agent which is regenerable by thermal decomposition, thereby regenerating the metalloidal element and oxidizing the reducing agent; and the oxidized reducing agent is decomposed, thereby regenerating the reducing agent and producing oxygen, the net reaction of the closed cycle process being the decomposition of water into hydrogen and oxygen, the improvement which comprises:
   a. adding sufficient acid to the hydrolysis reaction mixture to maintain the pH thereof at less than or equal to substantially 5, the acid thereby becoming spent as a consequence of the formation of the corresponding salt of the metal and the acid, said acid being characterized by an anion capable of forming with the cation of a cation exchange resin in a subsequent cation exchange step a compound thermally decomposable into the acid and a substance capable of providing the cation of the cation exchange resin;
   b. contacting the spent acid with the cation exchange resin, thereby forming said thermally decomposable compound and the cation exchange resin thereby becoming spent;
   c. thermally decomposing said thermally decomposable compound into the acid and the substance capable of providing the cation of the cation exchange resin; and
   d. contacting the spent cation exchange resin from step (b) with the cations provided by the thermal decomposition step, thereby regenerating the cation exchange resin.

8. The method according to claim 7 wherein the acid is acetic acid, the cation exchange resin is an organic cation exchange resin having the ammonium ion as the cation thereon, and the thermally decomposable compound is ammonium acetate.

9. The method according to claim 8 wherein the intermetallic compound is an alkali metal selenide.

10. The method according to claim 9 wherein the alkali metal selenide is potassium selenide.

* * * * *